Sept. 20, 1971 | ITSUKI BAN | 3,606,191

ENDLESS MAGNETIC TAPE CARTRIDGE

Filed May 12, 1969

United States Patent Office 3,606,191

Patented Sept. 20, 1971

3,606,191

ENDLESS MAGNETIC TAPE CARTRIDGE

Itsuki Ban, 829 Higashi-Oizumimachi, Nerima-ku, Tokyo-to, Japan

Filed May 12, 1969, Ser. No. 823,786
Claims priority, application Japan, May 15, 1968, 43/39,286
Int. Cl. B65h *17/48*
U.S. Cl. 242—55.19A 3 Claims

ABSTRACT OF THE DISCLOSURE

An endless magnetic tape cartridge which is capable of recording and reproducing by an endless magnetic tape cartridge playing apparatus including a magnetic head and a rotary driving capstan, comprising a cartridge housing, a reel rotatably provided within the cartridge housing, an endless magnetic tape spirally wound to the reel, a pinch roller rotatably provided within the housing, a reel pulley provided on the reel, a pinch roller pulley provided on the pinch roller, and a belt interposed between the reel pulley and the pinch roller pulley. The tape is drivingly transported between the capstan and the pinch roller and the reel is rotated through the pinch roller pulley, belt and the reel pulley as the pinch roller is rotated.

The present invention reates to an endless magnetic tape cartridge and more particularly to an endless magnetic tape cartridge enabling a reel to which the endless magnetic tape is spirally wound to be rotated in relation to rotation of a built-in pinch roller.

A conventionally well-known endless magnetic tape cartridge is designed to spirally wind the endless magnetic tape to a reel rotatably provided within a cartridge housing. The cartridge housing comprises a base portion, a wall portion upwardly extending from the base portion, a cover member resting atop the wall portion and a window is formed on the wall portion on a part thereof to allow a magnetic head of a playing apparatus and a rotary driving capstan to be inserted into the cartridge housing. A pinch roller is mounted inside the cartridge housing. The tape is held between the pinch roller and the capstan and is drivingly transported by abutting against the magnetic head to be drawn out of the inside of a vortex and wound to the outside thereof. During transportation of the tape, one tape portion to be wound and the other wound are overlied to each other and they are slidably, inwardly moved to the inside of the spiral while the reel is rotated in a manner that a rotation force is imparted to the reel by a force in which the tape is drawn out. This will cause a slight vibration on the tape in relation to the transport direction thereof and therefore a wow and flutter is caused in the tape. Due to the tape fast feed, the number of rotations of the capstan is rapidly increased with an inertia of the reel and the tape. As a result, the tape results in that not only is the draw-out effected but the wind-up is not made simultaneously therewith. Accordingly, trouble is developed that the tape is run out from the cartridge housing or a backlash of the tape is caused. On the other hand, returning the tape from fast feed to normal speed may cause the tape to result in backlash due to the overrun of the reel and the tape according to inertia. It has been proved by experiment that if the tape is returned in a moment ahead of one and half seconds from the fast feed at speed per 30 seconds to the normal feed at speed per ten seconds, the tape surely results in its backlash due to the overrun. In use, it is desired that the fast feed requires about ten times the speed as the normal feed does and that the moment for which the tape is returned to the normal feed is within two seconds, however, the conventional type cartridge does not meet these requirements.

Some of the pinch roller built-in type cartridges are adapted so that the pinch roller is rotatably supported on a lever swingably pivoted within the cartridge housing whereby the lever is biased by a spring and the one portion of the lever is engaged with the periphery of the reel disk. In such cartridge, the lever is away from the reel disk by allowing the pinch roller to abut against the capstan and the reel is freely rotated while rotation of the reel is arrested by engagement of the lever therewith after the pinch roller is away from the capstan. With this arrangement, there may be the advantage that the tape winding is not out of order even if the cartridge is carried to and fro since the reel is normally prevented from undesirable rotation by engagement of the lever therewith. However, if the cartridge is slowly received in or withdrawn from the tape cartridge recording and reproducing apparatus, a portion of the lever intends to engage the reel as the pinch roller abuts against the capstan. In this instance, the tape winding is incomplete to cause the tape to be run out of the cartridge housing whereby the cartridge is incapable of reuse thereof, even if the tape is transported, since the reel is maintained in non-rotative position. The rundown of the tape is more frequent when teeth are formed at the reel disk or the disk is eccentric.

As described in the foregoing, many disadvantages are derived from the use of the conventional endless magnetic tape cartridge.

It is, therefore, a principal object of the invention to provide a pinch roller built-in type endless magnetic tape cartridge.

Another object of the invention is to provide an endless magnetic tape cartridge wherein a reel to which the endless magnetic tape is vortically wound and a pinch roller are coupled by a belt transmission device whereby the reel is rotated in cooperation with rotation of the pinch roller.

A further object of the invention is to provide an endless magnetic tape cartridge wherein the pinch roller is rotatably mounted on a swingable lever means to which rotation force is imparted by spring means, the pinch roller being engaged with a stopper mounted within a cartridge housing by elasticity of spring means to prevent free rotation of the pinch roller when the latter is away from a driving capstan of the endless magnetic tape cartridge playing apparatus and at the same time rotation of the reel is arrested.

According to the invention, the tape feed is stabilized and the withdrawal or winding of the tape is secured to prevent the run-down of the tape or backlash thereof since the pinch roller is rotated in cooperation with rotation of the reel.

Still another object of the invention is to provide an endless magnetic tape cartridge wherein a belt driving device is so designed that the rotary speed of a hub periphery of the reel is slightly less than the tape feed speed and a back tension is always applied to the tape so that the tape is under a tension to allow the same to engage a magnetic head of the endless magnetic tape cartridge playing apparatus.

Other objects and advantages of the invention will be apparent from the following description of the preferred embodiments of the invention taken in conjunction with the accompanying drawings in which.

DESCRIPTION OF THE PREFERRED EMBODIMENT

Figure 1:
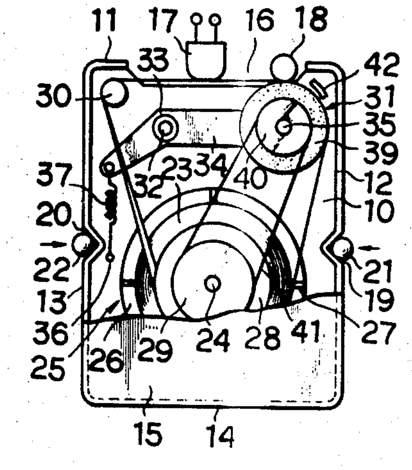
FIG. 1 is a plan view of an endless magnetic tape cartridge showing one embodiment thereof in operation with partially broken away.
Figure 2:
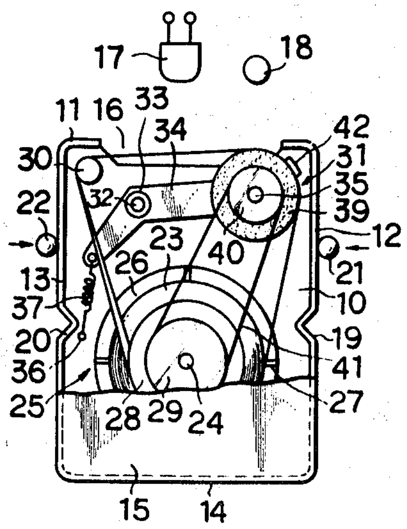
FIG. 2 is a plan view generally similar to FIG. 1 but showing the same in non-operation with partially broken away.
Figure 3:
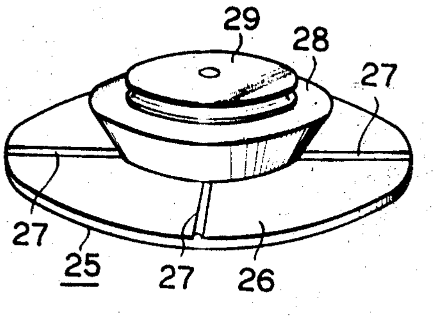
FIG. 3 is an enlarged perspective view of the reel of the endless magnetic tape cartridge shown in FIG. 1.
Figure 4:
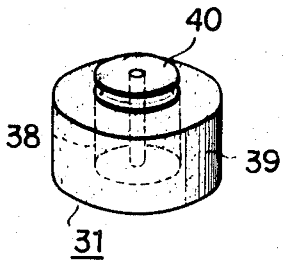
FIG. 4 is an enlarged perspective view of the pinch roller of the endless magnetic cartridge shown in FIG. 1.

A cartridge housing, as shown in FIGS. 1 and 2 is of, for example, plastic and comprises a base portion 10 of substantially rectangular shape, a front wall 11, side walls 12, 13, rear walls 14 each of which extend from the base portion 10, and a ribbed cover member 15 which is similar in configuration to the base portion 10 and rests atop the walls. The front wall 11 is provided with a window 16 to allow a magnetic head 17 of an endless magnetic tape cartridge playing apparatus (not shown) and a driving capstan 18 to enter into the cartridge housing. Depressions 19, 20 are formed on the side walls to receive retainer member 21, 22 provided on the apparatus when the tape cartridge is fully inserted in the endless magnetic tape cartridge playing apparatus (not shown). The retainer members 21, 22 are each made of, for instance, a steel ball and biased by elasticity of spring (not shown) in the direction of the arrow shown in FIGS. 1 and 2. Rotatably mounted on a center shaft 24 upwardly extending from the base portion 10 is a reel 25 to which an endless tape 23 is wound. As shown in details in FIG. 3 the reel 25 is formed, for example, of plastic and comprises a disk 26 having a plurality of bosses 27 radially arranged thereon, a tapered hub 28 over the disk 26, and a pulley 29 over the hub 28. The magnetic tape 23 is wound to the hub 28 and engaged at the lower side thereof with the bosses 27. A portion of the magnetic tape 23 is withdrawn from inside of the tape roll and guided by a guide 30, a pinch roller 31 provided on the base portion 10 adjacent the front wall 11, then is reeled in from the outside of the tape roll. The pinch roller 31 is rotatably mounted on a fixed axis 35 upwardly extending from one end of a plate-like lever 34 swingably mounted by a sleeve 33 on a fixed axis 32 upwardly extending from the base portion 10. The lever 34 is counterclockwise biased as centering about the fixed axis 32 by elasticity of a spring 37 interposed between the other end of the lever 34 and a pin 36 upwardly extending from the base portion 10. The pinch roller 31, as will be shown in detail in FIG. 4, comprises a rotary cylinder 38 of, as for example, a plastic having an aperture (not shown) in which the fixed axis 35 is loosely inserted, a typically rubber-made circumferential rim 39 mounted on the periphery of the rotary cylinder 38, and a pulley 40 which is positioned above the surface of the rim 39 and formed integrally with the rotary cylinder. A typically rubber-made, elastic belt 41 is interposed between the pulleys 40 and 29. Provided on the base portion 10 disposed between the front wall 11 and the pinch roller 31 is an arcuate stopper 42 opposed to the periphery of the rim.

As shown in FIG. 1, when the cartridge is fully inserted in the tape cartridge playing apparatus, the driving capstan 18 about against the pinch roller 31 through the window 16 of the front wall 11 and the magnetic head 17 engages the tape 23. At this point, the lever 34 slightly clockwise rotates about the fixed axis 32 against the elasticity of the spring 37. As a result, the driving capstan 18 and the pinch roller 31 elastically abut against each other by elasticity of the spring 37. The drive of the pinch roller 31 by the driving capstan 18 causes the tape 23 to be withdrawn from the interior of the hub 28 over the disk 26 and to pass over the guide 30 for engagement with the magnetic head 17 and hence the tape passes between the capstan 18 and the pinch roller 31 to be wound onto the outer periphery of the tape roll. The reel 25 is rotated as the pinch roller 31 is rotated due to connection of the pinch roller 31 with the reel 25 through a belt transmission device comprising the pulley 40, the belt 41, and the pulley 29. By properly determining the diameter of the pulleys 40 and 29, and allowing the rotary speed of the periphery of the hub 28 to correspond to the tape feed speed, the drive of the tape 23 by the capstan 18 and the pinch roller 31 is smoothly effected to stabilize the tape feed speed to thus reduce the wow-flutter. Rotation of the capstan 18 at high speed for the purpose of the tape fast feed increases the tape feed speed with the increase of the rotary speed of the reel 25. In this manner, the tape 23 may be withdrawn from the reel 25 at a speed corresponding to the tape feed speed and thus is stably run. The tape is also stably run even when the tape is changed from fast to normal feed, since the rotary speed of the reel 25 is varied in response to the variation of the tape feed speed. As illustrated in FIG. 2, when the tape cartridge is withdrawn from the tape cartridge playing apparatus and thus the pinch roller 31 is away from the capstan 18, rotation of the pinch roller 31 is interrupted. In this instance, according to a conventional endless magnetic tape cartridge, as previously mentioned hereinbefore, the tape is intended to be exceedingly withdrawn due to the inertia even after interruption of rotation of the pinch roller or a portion of the tape is apt to protrude from the outside of the cartridge since the reel is controlled before the pinch roller is away from the capstan thereby withdrawal of the tape is not effected while the tape is not reeled. The above mentioned defects is eliminated by the illustrated cartridge according to the invention.

If the diameter of the pulleys 40 and 29 is so properly determined that the rotary speed of the periphery of the hub 28 is slightly less than that of the tape 23, some back tension will act on the running tape 23 so that the tape can abut against the magnetic head 17 under the condition in which the tape is tensioned. For this reason, a full abutment force between the tape 23 and the magnetic head 17 may be obtained without requiring the use of a tape pad which is provided in a conventional endless magnetic tape cartridge.

In FIG. 2, there is shown the cartridge which is withdrawn from the recording-reproducing apparatus to a slight extent. When the cartridge is withdrawn from the tape cartridge playing apparatus, the capstan 18 is away from the pinch roller 31 and the lever 34 is counterclockwise rotated about the fixed axis 32 to allow the pinch roller 31 abut against the stopper 42. As a result, the pinch roller 31 is controlled by the stopper 42 at the same time the reel 25 is also controlled by the pulley 40, the belt 41, and the pulley 29. Therefore, the operation of each member of the cartridge is caused to be interrupted simultaneously with withdrawal of the cartridge from the apparatus. The stopper 42 is so adapted to be disposed in a position where the stopper 42 abuts against only the rim 39 but not the tape, that is to say, it abuts against the lower side of the periphery of the rim 39. With this arrangement, for instance, there is no problem of the tape 23 sticking to the rim 39 by abutment of the rim 39 with the support 42 for a long time. Also, no obstruction is caused in driving of the tape 23 by the capstan 18 and the pinch roller 31 even though the rim 39 is deformed by abutting against the stopper 42.

The invention and its attendent advantages will be understood from the foregoing description. It is to be understood that changes and variations may be made without departing from the spirit and scope of the invention as described in the appended claims.

What is claimed is:

1. An endless magnetic tape cartridge which is capable of recording and reproducing by an endless magnetic tape cartridge playing apparatus including a magnetic head and a rotary driving capstan, comprising:

a cartridge housing, said cartridge housing having a base portion, a wall portion upwardly extending from the base portion, and a cover member resting atop the wall portion, said wall portion being provided with a window to allow said magnetic head and said driving capstan to substantially enter into said cartridge housing;

a reel rotatably provided within the cartridge housing, said reel including a disk and a hub projecting from said disk at the center thereof;

a first pulley coaxially mounted on said reel;

an endless magnetic tape spirally wound on said reel around said hub, a portion of said tape being drawn out of the portion adjacent the hub periphery and being wound on the outer periphery of the spiral along said window;

a tape guide provided within said cartridge housing for guiding the portion of the tape adjacent said window;

a lever pivotally mounted on said base portion;

a pinch roller rotatably mounted on said lever, a stopper mounted on said base portion adjacent said window, spring means normally urging said lever in a direction whereby said pinch roller normally contacts said stopper thereby preventing rotation of said pinch roller, said pinch roller being adapted to be moved out of contact with said stopper when said driving capstan engages said pinch roller and to abut against said driving capstan through the tape to drive the tape in cooperation with said driving capstan;

a second pulley coaxially mounted on said pinch roller;

and a belt of elastic material interposed between said pulleys for rotating said reel in cooperation with said pinch roller, said pulleys having a transmission ratio allowing a peripheral speed of said hub to substantially correspond to the tape feed speed.

2. An endless magnetic tape cartridge in accordance with claim 1, wherein said pinch roller has a peripheral surface wider than the width of the tape, said pinch roller and said stopper being arranged so that the portion of said peripheral surface with which the tape is not engaged is adapted to be engaged with said stopper.

3. An endless magnetic tape cartridge in accordance with claim 2 wherein the pulleys have a transmission ratio such that the peripheral speed of said hub is less than the tape feed speed.

References Cited

UNITED STATES PATENTS 3,489,362 1/1970 Linning ---------- 242—55.19A

FOREIGN PATENTS 769,569 10/1967 Great Britain ---- 242—55.19A 424,301 5/1967 Switzerland ------ 242—55.19A BILLY S. TAYLOR, Primary Examiner U.S. Cl. X.R.

242—197